United States Patent [19]

Omaru et al.

[11] Patent Number: 5,451,477
[45] Date of Patent: Sep. 19, 1995

[54] NON-AQUEOUS LIQUID ELECTROLYTE SECONDARY BATTERY

[75] Inventors: Atsuo Omaru, Kanagawa; Masayuki Nagamine; Naoyuki Nakajima, both of Fukushima, all of Japan

[73] Assignee: Sony Corporation, Tokyo, Japan

[21] Appl. No.: 254,062

[22] Filed: Jun. 3, 1994

[30] Foreign Application Priority Data

Jun. 3, 1993 [JP] Japan .................................. 5-133345
Nov. 19, 1993 [JP] Japan .................................. 5-290496

[51] Int. Cl.$^6$ ............................................. H01M 4/02
[52] U.S. Cl. .................................... 429/218; 429/232; 429/197; 429/194
[58] Field of Search ................. 429/218, 232, 197, 194

[56] References Cited

U.S. PATENT DOCUMENTS

| | | | |
|---|---|---|---|
| 4,056,663 | 11/1977 | Schlaikjer | 429/197 |
| 4,959,281 | 9/1990 | Nishi et al. | 429/194 |
| 5,028,500 | 7/1991 | Fong et al. | 429/194 |
| 5,162,176 | 11/1992 | Heir et al. | 429/194 |
| 5,294,498 | 3/1994 | Omaru et al. | 429/122 |
| 5,316,876 | 5/1994 | Kuriyama et al. | 429/197 |
| 5,340,670 | 8/1994 | Takami et al. | 429/194 |

FOREIGN PATENT DOCUMENTS

| | | |
|---|---|---|
| 050441 | 4/1981 | European Pat. Off. . |
| 486950 | 5/1991 | European Pat. Off. . |
| 529095 | 3/1992 | European Pat. Off. . |
| 531617 | 3/1992 | European Pat. Off. . |
| 541889 | 5/1992 | European Pat. Off. . |
| 495613 | 7/1992 | European Pat. Off. . |
| 520667 | 12/1992 | European Pat. Off. . |
| WO90/13924 | 11/1990 | WIPO . |

OTHER PUBLICATIONS

Patent Abstracts of Japan, vol. 16, No. 48, 1992 & JP-A-03 252 053 "Nonaqueous Electrolyte Secondary Battery" Feb.

*Primary Examiner*—Stephen Kalafut
*Assistant Examiner*—Richard H. Lilley, Jr.
*Attorney, Agent, or Firm*—Hill, Steadman & Simpson

[57] ABSTRACT

A non-aqueous liquid electrolyte secondary battery including an anode formed of a carbon material capable of doping and de-doping of lithium, a cathode formed of a lithium-containing transition metal composite oxide and a non-aqueous liquid electrolyte is disclosed. The carbon material for the anode contains graphite and a non-graphitic carbon material formed of at least a non-graphitizable carbon material or a graphitizable carbon material. The non-graphitic carbon material preferably exhibits a discharge capacity per gram 80% or more of that of the graphite, measured in the first cycle of intermittent charging and discharging. The non-graphitic carbon material exhibits a ratio of a discharge capacity up to 0.3 V to a discharge capacity up to 1.5 V which is not smaller than 0.5, measured in the first cycle of intermittent charging and discharging with a standard of a lithium potential. Specifically, the graphite has a true density of 2.1 g/cm$^3$ or greater, an interplanar distance of (002) of less than 0.340 nm found by X-ray diffraction, and a C-axis crystallite size of the (002) plane of 14.0 nm or greater. The non-graphitic carbon material has a true density of 1.70 g/cm$^3$ or smaller, an interplanar distance of (002) plane of 0.37 nm or greater, and no exothermic peak observed at temperatures not lower than 700° C. in differential thermal analysis in an air stream. The non-aqueous liquid electrolyte is a liquid electrolyte formed by dissolving an electrolyte into a non-aqueous solvent containing ethylene carbonate.

10 Claims, 4 Drawing Sheets

NON-AQUEOUS LIQUID ELECTROLYTE SECONDARY BATTERY

BACKGROUND OF THE INVENTION

This invention relates to a non-aqueous liquid electrolyte secondary battery using a carbon material for its anode.

As technologies in electronics have been remarkably evolved, a variety of electronic equipment has become smaller and lighter. Accordingly, it has been required that batteries as portable power sources be increasingly smaller, lighter, and higher in energy density.

Conventionally, aqueous solution type secondary batteries, such as lead batteries and nickel-cadmium batteries, are primarily used as secondary batteries for general use. However, though these aqueous solution type secondary batteries exhibit excellent cyclic properties, they are not satisfactory in weight and energy density.

Meanwhile, recently, a non-aqueous liquid electrolyte secondary battery using lithium or a lithium alloy for its anode has been researched and developed prevalently. This non-aqueous liquid electrolyte a secondary battery has a high energy density, exhibits only a small amount of self-discharge, and is lightweight.

However, in this non-aqueous liquid electrolyte secondary battery, there is a high possibility that lithium is crystallized in dendritic form on the anode when the battery is charged in proceedings of charge/discharge cycles, and that the crystallized lithium finally reaches the cathode to generate an internal short circuit. Therefore, it is difficult to employ this non-aqueous liquid electrolyte secondary battery for practical use.

Thus, a non-aqueous liquid electrolyte secondary battery using a carbon material for its anode has been proposed. This non-aqueous liquid electrolyte secondary battery utilizes doping and releasing lithium into and from between carbon layers of the carbon material. By doing so, the battery does not exhibit such a phenomenon that dendritic lithium precipitates on the anode even though charge/discharge cycles proceed. The battery has a high energy density, and is lightweight as well as satisfactory in charge/discharge cyclic property.

Meanwhile, among various carbon materials usable for the anode of such an aqueous liquid electrolyte secondary battery, the first one that was practically used for the anode is cokes or a non-graphitizable carbon material, such as glass like carbon, that is, a carbon material of low crystalline property formed by heat-treating an organic material at a relatively low temperature. A non-aqueous liquid electrolyte secondary battery which has the anode formed of cokes or the non-graphitizable carbon material and a liquid electrolyte using propylene carbonate (PC) as the main solvent is already commercialized.

In addition, graphite of a high crystalline carbon material having a grown crystalline structure is recently used for the anode.

Graphite has a higher true density than the non-graphitizable carbon material of low crystalline property, and therefore exhibits a high electrode packing property when used for the anode. Thus, it is possible to design the battery of high energy density.

Graphite was considered to be unusable for the anode because it decomposes PC used as the main solvent of the conventional non-aqueous solvent. However, it has been found that the above inconvenience can be eliminated by using ethylene carbonate (EC) for the main solvent instead of using PC. Thus, a non-aqueous liquid electrolyte secondary battery which has the anode formed of graphite and a liquid electrolyte using EC as the main solvent has been proposed.

The non-aqueous liquid electrolyte secondary battery having the anode formed of graphite exhibits a high energy density and a flat discharge curve. Therefore, this battery is advantageous in that it generates no energy loss in voltage conversion by an electronic device.

However, the anode formed of graphite having a high true density causes lithium ions to diffuse slowly therein in the charge/discharge and is likely to cause polarization, while having high electrode packing property. For this reason if the battery is charged with relatively high drain, an overvoltage caused by polarization makes the anode potential baser than the lithium potential, causing lithium metal to precipitate on the anode surface. The precipitated lithium stays in a passive state, deteriorating the cyclic property.

If the non-aqueous liquid electrolyte secondary battery having the anode, formed of glass like carbon is charged at a constant voltage, which is the final voltage of 4.2 V of a practical battery the anode singly exhibits a potential of not higher than 50 mV vs. Li/Li$^+$ at the end of the charge. On the other hand, if the non-aqueous liquid electrolyte secondary battery having the anode formed of graphite is charged under the same condition, the anode singly exhibits a potential reaching 100 to 150 mV at the end of the charge.

The non-aqueous liquid electrolyte secondary battery having the anode formed of graphite has a potential of the anode at the end of the charge 50 to 100 mV higher than the non-aqueous liquid electrolyte secondary battery having the anode formed of glass like carbon, though the two batteries are charged at the same final voltage. As the anode potential is high at the end of the cathode material, thus destabilizing the cathode. Consequently, charge, a large amount of lithium is extracted from the active the battery is not reliable in environment-resistant performance.

SUMMARY OF THE INVENTION

In view of the above-described status of the art, it is an object of the present invention to provide a non-aqueous liquid electrolyte secondary battery which exhibits a high electrode packing property, has an anode exhibiting a high diffusion speed of lithium ions in the charge/discharge and a relatively base potential at the end of the charge, and is satisfactory in energy density, cyclic property and reliability.

Through intensive studies, the present inventors have found that, by combining graphite of high true density with a non-graphitic carbon material exhibiting a higher diffusion speed of lithium ions than graphite to make the two materials concomitant in the anode, it is possible to form an anode which has a high electrode packing property, avoids precipitation of lithium metal even in high drain charge, and has a relatively base potential of the anode.

The non-aqueous liquid electrolyte secondary battery of the present invention has been completed on the basis of the above knowledge. The non-aqueous liquid electrolyte secondary battery of the present invention includes an anode formed of a carbon material electrochemically capable of doping and de-doping lithium ions, a cathode formed of a transition metal composite oxide containing lithium, and a non-aqueous liquid electrolyte. The carbon material forming the anode contains graphite and at least one non-graphitic carbon material selected from a non-graphitizable carbon material and a graphitizable carbon material.

It is preferred that the non-graphitic carbon material has a discharge capacity per gram not less than 80% of that of the graphite material, measured in the first cycle of an intermittent charging and discharging technique. It is also preferred that the non-graphitic carbon material occupies 10 to 90% by weight of the total of the non-graphitic carbon material and graphite.

It is also preferred that the ratio of discharge capacity up to 0.3 V to discharge capacity up to 1.5 of the non-graphitic carbon material, measured in the first cycle of the intermittent charging and disc charging technique, is not less than 0.5, vs. Li/Li+.

In addition, it is preferred that the non-graphitic carbon material is a non-graphitizable carbon material which has a true density of not greater than 1.70 g/cm$^3$, an interplanar distance of the (002) plane of not smaller than 0.37 nm measured by X-ray diffraction, and no exothermic peak of oxidation observed at 700° C. and higher temperatures in differential thermal analysis (DTA). By true density as used herein is meant density of the carbonaceous material only, excluding binder.

Also, the non-graphitizable carbon material may contain phosphorous.

On the other hand, it is preferred that graphite has a true density of not less than 2.1 g/cm$^3$, an interplanar distance of the (002) plane of less than 0.340 nm measured by X-ray diffraction, and a C-axis crystallite size of the (002) plane of not smaller than 14.0 nm.

The non-aqueous liquid electrolyte secondary battery of the present invention employs graphite and at least one non-graphitic carbon material selected from the non-graphitizable carbon material and the graphitizable carbon material in the form of concomitant body for the anode. It can be said that the concomitant body is of the non-graphitic carbon material and the graphite material formed by adding, as a graphitization catalyst, a metal of IVb to VIIb and VIII group elements in the periodic table or a compound thereof to the non-graphitizable carbon material, the graphitizable carbon material, a raw material thereof or a carbonized precursor thereof, and then heating the resulting material.

Also, the non-aqueous liquid electrolyte of the non-aqueous liquid electrolyte secondary battery according to the present invention is formed by dissolving an electrolyte into a non-aqueous solvent containing, for example, ethylene carbonate.

In this case, it is preferred that the non-aqueous solvent contains chain carbonic ester.

The chain carbonic ester can be exemplified by an asymmetrical chain carbonic ester, and more particularly a mixed solvent of methylethyl carbonate (MEC) and dimethyl carbonate (DMC).

As is described above, the non-aqueous liquid electrolyte secondary battery, uses the concomitant body of graphite and the non-graphitic carbon material for the anode instead of singly using graphite or the non-graphitic carbon material.

Graphite is a carbon material having a high crystalline property and a high true density. Therefore, the anode formed of graphite is high in electrode packing property, improving the energy density of the battery. However, the anode formed solely of graphite causes lithium to diffuse slowly therein in the charge/discharge. For this reason, if the battery is charged with high drain, large polarization is generated. Consequently, as the overvoltage makes the anode potential baser than the lithium potential, the lithium metal precipitates on the anode surface, deteriorating the cyclic property. Also, the potential of the anode after the charge is relatively noble and extracts a large amount of lithium from the active cathode material in the charge, thus destabilizing the cathode.

On the contrary, the non-graphitic carbon material of low crystalline property has a low true density, and therefore is not advantageous for obtaining a good electrode packing property. However, since the non-graphitic carbon material exhibits a high speed of lithium ion diffusion in the charge/discharge, it does not cause precipitation of the lithium metal as in the anode formed solely of graphite, even when the battery is charged with high drain. Also, as the anode potential after the charge is relatively base, it does not destabilize the cathode.

If such graphite or non-graphitic carbon material is singly used to form the anode, the cycle life of the battery may be shortened and sufficient energy density cannot be obtained. However, if graphite and the non-graphitic carbon material are combined to form the anode, the anode having both the high true density of graphite and the high-speed diffusion of lithium ions of the non-graphitic carbon material is realized. That is, the realized anode has a high electrode packing property, causes no precipitation of the lithium metal even in the overvoltage in the high drain charge, has the base anode potential after the charge, and avoids destabilizing the cathode.

Graphite that has such parameters of crystalline structure as a true density of not less than 2.1 g/cm$^3$, an interplanar distance of the (002) plane of less than 0.340 nm measured by X-ray diffraction, a C-axis crystallite size of the (002) plane of not smaller than 14.0 nm and a G value in the Raman spectrum of not smaller than 2.5, exhibits a particularly high electrode packing property. By using such graphite, the energy density is further improved.

A non-graphitic carbon material that has such parameters of crystalline structure and property parameters as a true density of not less than 1.70 g/cm$^3$, an interplanar distance of the (002) plane of not smaller than 0.37 nm measured by X-ray diffraction, and no exothermic peak of oxidation observed at 700° C. and high temperatures in differential thermal analysis in the air stream, exhibits a large doping volume of lithium. By using such a non-graphitic carbon material, the energy density is improved.

If ethylene carbonate is used as the main solvent of the liquid electrolyte where the above graphite and non-graphitic carbon material are combined for the use as the anode material, the anode performance is sufficiently exhibited because ethylene carbonate is more stable with respect to graphite than propylene carbonate used as the main solvent of the conventional liquid electrolyte.

Furthermore, by adding a chain carbonic ester, more preferably a mixed solvent of an asymmetrical chain carbonic ester or MEC and DEC, as the second component solvent to the non-aqueous solvent consisting mainly of EC, it is possible to obtain a high conductivity, improve reliability in the use at high temperatures and low temperatures, and restrict the reaction of the non-aqueous solvent with the lithium metal.

As is apparent from the above description, the non-aqueous liquid electrolyte secondary battery uses the combination of graphite and the non-graphitic carbon material to form the anode. Therefore, it is possible to produce the anode which exhibits the high electrode packing property, the high diffusion speed of lithium ions in charge/discharge, and the base potential at the end of the charge. Thus, it is possible to produce the non-aqueous liquid electrolyte secondary battery which is satisfactory in energy density, cyclic property and reliability.

DETAILED DESCRIPTION OF THE PREFERRED EMBODIMENT

A non-aqueous liquid electrolyte secondary battery includes an anode composed of a carbon material as an anode material, a cathode composed of a transition metal composite oxide including lithium as an active cathode material, and a non-aqueous liquid electrolyte.

The battery of the present invention employs both graphite and a non-graphitic carbon material, that is, a concomitant body of graphite and the non-graphitic carbon material, for the anode, in order to realize an anode that has a high electrode packing property, causes no precipitation of a lithium metal in high drain charge and has a relatively base potential at the end of the charge, and to improve energy density, cycle life and reliability of the battery. The non-graphitic carbon material herein means a non-graphitizable carbon material, a graphitizable carbon material, or a mixture of these materials.

First, graphite is a carbon material having a high crystalline property and a high true density. Consequently, by forming the anode of this graphite, it is possible to improve the electrode packing property of the anode and the energy density of the battery. However, the anode formed solely of graphite causes lithium ions to diffuse slowly in the charge/discharge, and therefore large polarization in the high drain charge causes lithium to precipitate on the anode surface, deteriorating the cyclic property. Also, since the anode potential after the charge is relatively noble, a large amount of lithium is extracted from the active cathode material in the charge, destabilizing the cathode.

On the other hand, the non-graphitic carbon material of low crystalline property has a low true density, and therefore is not advantageous for obtaining a good electrode packing property. However, the non-graphitic carbon material causes lithium ions to diffuse at a high speed in the charge, and does not cause precipitation of lithium ions as in the case of graphite, even in the high drain charge. Also, since the anode potential after the charge is relatively base, it avoids destabilizing the cathode.

If such graphite or non-graphitic carbon material is singly used to form the anode, the cycle life and the energy density of the battery are not sufficiently obtained. However, if graphite and the non-graphitic carbon material are combined to be concomitant in the anode, instead of being singly used, an anode having both the high true density of graphite and the high-speed diffusion of lithium ions of the non-graphitic carbon material can be realized. That is, the resulting anode has a high electrode packing property, causes no precipitation of the lithium metal even in an overvoltage state in the high drain charge, has a relatively base potential after the charge, and avoids destabilizing the cathode.

Since graphite is used to enhance the electrode packing property, it is preferable to select graphite having a high true density of not less than 2.1 g/cm$^3$, more preferably, not less than 2.18 g/cm$^3$.

The graphite having the true density in the above range has an interplanar distance of the (002) plane measured by X-ray diffraction, a C-axis crystallite size of the (002) plane and a G value in the Raman spectrum that satisfy the following conditions.

That is, a carbon material having an interplanar distance of the (002) plane of less than 0.340 nm, more preferably not less than 0.335 and not greater than 0.339 nm, and a C-axis crystallite size of the (002) plane of not less than 14.0 nm, has the true density in the above range.

In addition it is essential that the G value in the Raman spectrum is in a predetermined range, for the carbon material to satisfy the above conditions of the true density. The G value in the Raman spectrum, expressed by a ratio of an integrated intensity of a signal coming from a graphite structure to an integrated intensity of a signal coming from an amorphous structure, is an index of defects of a micro crystalline structure. A carbon material having a G value of not less than 2.5 has a true density of not less than 2.1 g/cm$^3$, while some of carbon materials having a G value of less than 2.5 do not have a true density of not less than 2.1 g/cm$^3$.

In the present invention, it is preferred to employ graphite having parameters of the crystalline structure which satisfy the above conditions. Either natural graphite or artificial graphite formed by carbonizing an organic material and heating the carbonized material at high temperatures may be used, as long as it has parameters of the crystalline structure satisfying the above conditions.

Typical artificial graphite is formed from coal or pitch as a starting material.

The pitch is exemplified by pitch formed from tar formed on high-temperature thermal decomposition of coal tar, ethylene bottoms or crude oil, or from asphalt, through distillation (such as vacuum distillation, atmospheric distillation or steam distillation), thermal polycondensation, extraction or chemical polycondensation, and pitch formed in wood carbonization.

It is also possible to use high molecular compounds, such as polyvinyl chloride resin, polyvinyl acetate, polyvinyl burylate, and 3,5-dimethyl phenol resin, as starting materials of the pitch.

These coal, pitch and high molecular compounds are in liquid states at the highest temperature of approximately 400° C. in the carbonization process. By being held at that temperature, these materials have aromatic cycles condensed into a polycyclic stacked state. If heated at approximately 500° C. or higher temperatures, these materials form solid carbon precursors, that is, semi-cokes. Such a process is called a liquid-phase carbonization process, which is a typical formation process of the graphitizable carbon.

Other starting materials can be exemplified by: condensed polycyclic hydrocarbon compounds, such as, naphthalene, phenanthrene, anthracene, triphenylene, pyrene, perylene, pentaphene, and pentacene; derivatives thereof, such as, carboxylic acids, carboxylic anhydrides, and carboxylic imides; mixtures of the foregoing compounds; condensed heterocyclic compounds, such as, acenaphtylene, indole, isoindole, quinoline, isoquinoline, quinoxaline, phthalazine, carbazole, acridine, phenazine, and phenanthridine; and derivatives thereof.

To produce desired artificial graphite using the above-mentioned organic starting materials, it is necessary, first to carbonize the organic material in an inactive gas stream, such as nitrogen, at 300° to 700° C., then to calcine the carbonized material in the inactive gas stream at the temperature rising rate of 1° to 100° C. per minute, the ultimate temperature of 900° to 1500° C., with the retention time of 0 to 30 hours, and subsequently to heat the material at 2000° C. or higher temperatures, preferably 2500° C. or higher. As a matter of course, carbonization and calcination may be omitted in some cases.

On the other hand, the non-graphitic carbon material to coexist with graphite in the anode is a non-graphitizable carbon material, a graphitizable carbon material, or a mixture of these materials. It is desirable to select a non-graphitic carbon material of the most satisfactory ion diffusion property. It is also preferred to take account of the following characteristics.

First, it is desirable to employ a non-graphitic carbon material which is capable of dope and undope of a large amount of lithium, and which singly exhibits high performance as the anode material. For instance, it is desirable to employ a non-graphitic carbon material exhibiting a discharge capacity per gram which is 80% more preferably 90%, of the discharge capacity of a graphite material, measured in the first cycle of the intermittent charging and discharging technique.

The intermittent charging and discharging technique herein is a technique of charging and discharging for intermittently charging and discharging with a recess between them, using a test electrode formed of a target carbon reagent for property investigation and implanted into a battery.

That is, the intermittent charging and discharging is conducted by repeating a charge/recess cycle of charging the battery for one hour at a constant current of 0.5 mA for doping test electrode with lithium and then having a two-hour recess, while observing the change in potential. Strictly, the carbon material is doped with lithium ions in the discharge process in this test. However, in accordance with the eventual battery, the doping process herein regarded as the charge process.

The repetition of the charge/recess cycle ends when the equilibrium potential presumed by plotting the change in potential in relation to time$^{-\frac{1}{2}}$ in the recess reaches 3 to 15 mV.

Then, a discharge/recess cycle of discharging the battery for one hour at a current of 0.5 mA for undoping lithium from the test electrode and then having a two-hour recess is repeated similarly while observing the change in potential. Strictly, the carbon material is undoped with lithium ions in the charge process in this test. However, in accordance with the eventual battery, the lithium undoping process is herein regarded as the discharge process.

The repetition of the discharge/recess cycle ends when the terminal voltage reaches 1.5 V.

The discharge capacity per gram of the carbon material can be found from a charge/discharge curve along the time in relation to the potential obtained by the charge.

Thus, one cycle of the intermittent charging and discharging technique is conducted. A non-graphitic carbon material having the discharge capacity per gram which is 80%, preferably 90%, of the discharge capacity per gram of a graphite material, measured in the above cycle, does not eliminate the high capacity of graphite and improves the energy density of the battery. It is preferred that the discharge capacity per gram of graphite measured in the first cycle of the intermittent charging and discharging technique is not less than 270 mAh.

Second, the graphite for combined use with the non-graphitic carbon material has the single-electrode open circuit potential which is noble vs. Li/Li$^+$ after the charge and extracts a large amount of lithium from the cathode, destabilizing the cathode. Therefore, it is desirable to employ a non-graphitic carbon material which has a charge/discharge curve having a relatively long flat portion near the lithium potential to attenuate such properties of the graphite.

Specifically, it is desirable to employ a non-graphitic carbon material exhibiting a ratio of the discharge capacity up to 0.3 V to the discharge capacity up to 1.5 V measured in the first cycle of the intermittent charging and discharging, which is not less than 0.5 vs. Li/Li$^+$. By using such a non-graphitic carbon material, the cathode is stabilized and the battery becomes more environment-resistant.

In addition, graphite, if doped with lithium, may have an extended interlayer distance of carbon to expand the entire electrode and thus pressurize the separator, inducing an internal short circuit. Therefore, the third requirement for the non-graphitic carbon material is that it causes little dimensional change of the electrode when the electrode is doped with lithium.

The non-graphitic carbon material satisfying these requirements is exemplified by a graphitizable carbon material formed by calcining the following starting materials.

Typical starting materials to form the graphitizable carbon material are coal and pitch.

The pitch is exemplified by pitch formed from tar formed on high-temperature thermal decomposition of coal tar, ethylene bottoms or crude oil, or from asphalt, through distillation (such as vacuum distillation, atmospheric distillation or steam distillation), thermal polycondensation, extraction or chemical polycondensation, and pitch formed in wood carbonization.

It is also possible to use high molecular compounds, such as polyvinyl chloride resin, polyvinyl acetate, polyvinyl butylate, and 3,5-dimethyl phenol resin, as the starting materials.

Other start materials can be exemplified by: condensed polycyclic hydrocarbon compounds, such as, naphthalene, phenanthrene, anthracene, triphenylene, pyrene, perylene, pentaphene, and pentacene; derivatives thereof, such as, carboxylic acids carboxylic anhydrides, and carboxylic imides; mixtures of the foregoing compounds; condensed heterocyclic compounds, such as acenaphtylene, indole, isoindole, quinoline, isoquinoline, quinoxaline, phthalazine, carbazole, acridine, phenazine, and phenanthridine; and derivatives thereof.

The graphizable carbon material is formed by first carbonizing any of the above starting materials in an inactive gas stream, such nitrogen, at 300° to 700° C., then raising the temperature up to 900° to 1500° C. at a temperature rising rate of 1° to 100° C. per minute, and subsequently holding the material at the ultimate temperature for 0 to 30 hours. As a matter of course, carbonization may be omitted in some cases.

Furthermore, the non-graphitic carbon material satisfying the above requirements can be exemplified by a non-graphitizable carbon material formed by calcining the following starting materials.

Conjugate resins, such as furfuryl alcohol resin, furfural resin, furan resin, phenol resin, acrylic resin, halogenated vinyl resin, polyimide resin, polyamideimide resin, polyamide resin, polyacetylene and P-phenylene, and organic high molecular compounds, such as cellulose and its derivative, can be used as the starting materials to form the non-graphitizable carbon material.

Also, a starting material formed by introducing an oxygen-containing functional group into, or oxygen crosslinking, petroleum pitch having a particular H/C atomic ratio is not fused in the carbonization process at 400° C. or higher temperatures, and therefore can be carbonized in a solid phase to be the non-graphitizable carbon material.

The petroleum pitch is formed from tar formed on high-temperature thermal decomposition of coal tar, ethylene bottoms or crude oil, or from asphalt, through distillation (such as vacuum distillation, atmospheric distillation or steam distillation), thermal polycondensation, extraction or chemical polycondensation. To form the non-graphitizable carbon material, the H/C atomic ratio of 0.8 to 0.8 is critical.

The measures for introducing the oxygen-containing functional group into the petroleum pitch are not particularly specified. However, techniques employed can be exemplified by: a wet method using an aqueous solution of nitric acid, mixed acids, sulfuric acid or hypochlorous acid; a dry method using an oxidizing gas, such as air or oxygen; and reaction of a solid reagent, such as sulfur, ammonium sulfate, ammonium persulfate or ferric chloride.

Although the oxygen percentage content is not particularly specified, it is preferably not less than 3%, more preferably not less than 5%, as disclosed in the JP Patent Kokai Publication Serial No. 3-252053. The oxygen percentage content affects the crystalline structure of the carbon material as the end product.

The non-graphitizable carbon material is formed by first carbonizing any of the above listed starting materials in an inactive gas stream, such as nitrogen, at 300° to 700° C., then raising the temperature up to 900° to 1500° C. at a temperature raising rate of 1° to 100° C. per minute, and subsequently holding the material at the ultimate temperature for 0 to 30 hours. As a matter of course, carbonization can be omitted in some cases.

Of the non-graphitizable carbon materials thus formed, those using a starting material formed by oxygen crosslinking furan resin composed of homopolymer or copolymer of furfuryl alcohol or furfural, or formed by oxygen crosslinking a petroleum pitch having a particular H/C atomic ratio, have an interplanar distance of the (002) plane of not less than 0.37 nm, a true density of not greater than 1.70 g/cm$^3$, and no exothermic peak of oxidation observed at 700° C. and higher temperatures in DTA. These non-graphitizable carbon materials have a large capacity available for charge/discharge, and exhibit highly preferable characteristics as the anode material of the battery.

Also, a compound composed mainly of phosphorus, oxygen and carbon, disclosed in the U.S. patent application Ser. No. 558,470, is preferable for the anode material, exhibiting property parameters similar to those of the non-graphitizable carbon material.

In addition, a non-graphitizable carbon material, formed by calcining any of the above-mentioned starting materials in an atmosphere in which various volatile constituents generated in calcination are efficiently removed, is preferable for the anode material, exhibiting high capability of being doped with lithium.

The volatile constituents generated in calcination of organic materials are efficiently removed by making an atmosphere of inactive gas flow. At this point, it is preferred that the inactive gas flows at a flow rate of not less than 0.1 ml/minute per gram of the material. Furthermore, by calcining the material in evacuation, it is possible to remove the volatile constituents more efficiently and thus to produce a non-graphitizable carbon material of high capability of being doped with lithium.

In the present invention, a concomitant body of graphite and a non-graphitic carbon material selected from the non-graphitizable carbon material, the graphitizable carbon material and the mixture thereof, as described above, can be used as the anode material.

It is desirable that the rate of the non-graphitic carbon material in the whole concomitant body is 10 to 90%, more preferably 20 to 80%, in view of the electrode packing density, the charge/discharge capacity per volume, diffusion speed of lithium ions and the battery weight. In this range, a higher mixing rate of graphite increases the electrode packing density, while a higher mixing rate of the non-graphitizable carbon material improves the diffusion speed of lithium ions in the charge/discharge, thus preventing precipitation of lithium in an overvoltage state and reducing the weight of the anode. Therefore, it is preferred to select the rate in consideration of importance of each property.

The concomitant body of graphite and the non-graphitic carbon material can be prepared as follows.

According to one technique, first, graphite and the non-graphitic carbon material are separately calcined, ground and classified in powdery states. Then, the powdery graphite and non-graphitic carbon material are mixed together to form a mixed carbon powder as the concomitant body for the anode. According to another technique, graphite and the starting material of the non-graphitic carbon material are mixed together at the raw material stage, to form a composite carbon material of graphite and the non-graphitic carbon material.

Then, the composite carbon material is ground and classified to provide the concomitant body for the anode. In this case, the yield of the non-graphitic carbon material is found in advance, and the starting material of the non-graphitic carbon material is mixed at a mixing rate based upon the yield.

It is also possible to produce the concomitant body with still another technique as follows. According to this technique, the concomitant body is produced by adding a graphitized catalyst to an organic raw material of the non-graphitic carbon material, a carbonization precursor yet to be calcined and a calcined carbon material itself, and then heat-treating the resulting material thus to form a graphite phase in the non-graphitic carbon material.

It is said in general that elements of IVb to VIIb and VIII groups, represented by iron and nickel, function as the graphitization catalyst. By adding inorganic compounds including these metals or metallic elements and organic compounds, such as an organic metal complex, to the above-mentioned carbon material and then heating the resulting material, it is possible to form the graphite phase at a relatively low temperature.

It is possible to add the catalyst in a variety of forms, from powder to a solution. It is preferred that the amount of the catalyst to be added is 0.1 to 50% by weight of the carbon material in the various states, that is, the organic raw material, the carbonization precursor yet to be calcined and the calcined carbon material.

For instance, in the case of adding the catalyst to the organic raw material, the catalyst is dissipated along with the volatile organic component from the system by heating. Therefore, a large amount of the catalyst needs to be added.

Although the crystalline property of the graphite phase in the concomitant body can be controlled with the temperature and the retention time of the final heat-treatment, the temperature of the graphite phase is suitably selected in accordance with the amount of the catalyst to be added and the state of the carbon material to which the catalyst is to be added.

The mixing ratio in the concomitant body produced by catalyst graphitization as described above can be found by dividing the diffraction peak found by X-ray diffraction into the non-graphitic carbon material peak and the graphite peak through geometrical processing and then calculating the ratio thereof.

The grinding in the process of forming the concomitant body may be carried out before or after carbonization, calcination, or high-temperature heat-treatment, or in the temperature raising process, of the carbon material formation process.

It is preferable to use the carbon material having a grain diameter of not smaller than 1 $\mu$m for the anode. An anode material containing a large amount of carbon grains of grain diameter of less than 1 $\mu$m increases the irreversible capacity only for charge and not for discharge in the initial stage of the charge/discharge cycle. Although the reason therefor is not clear, it can be considered that the grain of diameter of not greater than 1 $\mu$m has a large specific surface area and hence a large reactive area with the liquid electrolyte, and is thus likely to have a side reaction.

The upper limit of the grain diameter of the carbon powder differs in accordance with the size and structure of the battery to which the carbon powder is to be applied. It is preferable to set the upper limit within a range not exceeding at least the thickness of the separator. A cylindrical battery has an electrode of scroll structure in which a thin electrode and a separator are alternately stacked and wound. Since the separator of the smallest possible thickness is preferred in this battery, the upper limit of the grain diameter is set in a range of relatively small diameters. For a large battery, the grain diameter of the carbon powder can be set in a range of large diameters.

Meanwhile, in order to cause the anode to exhibit its maximum capacity, the active cathode material forming the cathode needs to be capable of supplying, to the anode, Li of the amount equivalent to the charge/discharge capacity of not less than 250 mAh per gram of the carbon material in a stationary state after the charge/discharge is repeated five times. It is preferred that the active cathode material is a transition metal compound capable of supplying Li of the amount equivalent to the charge/discharge capacity of not less than 300 mAh, more preferably not less than 330 mAh.

It is not necessary that the active cathode material provides all Li. Essentially it suffices that Li of the amount equivalent to the charge/discharge capacity of not less than 250 mAh per gram of the carbon material is present in the battery system. The amount of Li is determined by measuring the discharge capacity of the battery.

The transition metal compound having the above-described ion supply capability is exemplified preferably by a lithium-transition metal composite oxide expressed by a general formula, $LiMO_2$ with M indicating at least one of Co and Ni, or by an intercalation compound containing Li.

As the non-aqueous liquid electrolyte of the non-aqueous liquid electrolyte secondary battery, a non-aqueous solvent mixed with an electrolyte is employed.

It is essential to use EC as the main solvent of the non-aqueous solvent, because EC is unlikely to be decomposed by graphite forming the anode. In addition, it is desirable to add plural solvents to this EC to improve the conductivity and hence the current property, to lower the solidifying point of the liquid electrolyte to improve the low-temperature property, and furthermore, to lower reactivity with the lithium metal to improve safety.

Chain carbonic ester is preferably added as such a second component solvent. Particularly, asymmetrical chain carbonic ester, such as methylethyl carbonate (MEC) or methylpropyl carbonate (MPC), and a mixed solvent of MEC and DMC, are suitable as the second component solvent. It is preferable to set the volume ratio of MEC:DMC of the mixed solvent of MEC and DMC as the second component solvent in a range of 2:8 to 9:1. For the mixing ratio of EC as the main solvent to the second component solvent, it is preferable to set the volume ratio of EC:the second component solvent in a range of 7:3 to 3:7.

The liquid electrolyte is formed by adding an electrolyte to such a non-aqueous solvent. In this case, any electrolyte usable for this type of battery can be employed. For instance, $LiPF_6$, $LiClO_4$, $LiAsF_6$, $LiBF_4$, $LiB(C_6H_5)_4$, $CH_3SO_3Li$, $CF_3SO_3Li$, LiCl and LiBr can be employed. $LiPF_6$ is preferred above all.

Preferred embodiments of the present invention will now be described. However, it is to be understood that the present invention is not limited to these embodiments.

Experiment 1

First, a graphite powder A was formed by grinding natural graphite produced in Madagascar.

Next, a non-graphitic carbon powder 1 was produced as follows.

Petroleum pitch having an H/C atomic ratio of 0.6 to 0.8 was ground and oxidized in an air stream, to form a carbon precursor. The carbon precursor thus formed contained oxygen at a rate of 15.4% by weight. This carbon precursor was ground, and 10 g of the ground carbon precursor was filled into a pot, where it was held at 500° C. for 5 hours in a nitrogen stream, then heated up to 1100° C., and heat-treated for one hour to form a non-graphitizable carbon powder, that is, the non-graphitic carbon powder 1.

Table 1 shows the true density, the interplanar distance of the (002) plane, the C-axis crystallite size of the (002) plane and average grain diameter of the graphite powder A and the non-graphitic carbon powder 1. Of these property parameters, the interplanar distance of the (002) plane and the C-axis crystallite size of the (002) plane were found by powder X-ray diffraction, while the true density was measured by pycnometer using butanol for a solvent.

The graphite powder A and the non-graphitic carbon powder 1 thus produced were mixed at various ratios, to form concomitant bodies of graphite and non-graphitic carbon material. With the resulting concomitant body used for the anode, a coin-shape non-aqueous liquid electrolyte secondary battery and a cylindrical non-aqueous liquid electrolyte secondary battery were produced.

(1) Production of coin-shape non-aqueous liquid electrolyte secondary battery

The above-described concomitant body was pre-heated in an Ar atmosphere, at a temperature rising rate of approximately 30° C./minute, at an ultimate temperature of 600° C. and for a holding time of one hour, immediately before production of an anode mix. The pre-heated concomitant body was mixed with polyvinylidene fluoride as a binder at a rate equivalent to 10% by weight, and then with dimethyl formamide as a solvent. The resulting mixture was dried to form the anode mix.

37 mg of the anode mix thus prepared was molded along with an Ni mesh into pellet, 15.5 mm in diameter. This pellet was integrated as he anode electrode into the following cell structure so as to produce the coin-shape non-aqueous liquid electrolyte secondary battery.

Cell size: diameter of 20 mm, thickness of 2.5 mm
Cathode: Li metal
Separator: polypropylene porous membrane
Liquid electrolyte: a mixed solvent of EC and DEC at a mixing ratio of 1:1 with $LiPF_6$ dissolved therein at a concentration of 1 mol/l All the above processing was carried out in a dried air with a dew point of $-40°$ C. or lower.

(2) Production of cylindrical non-aqueous liquid electrolyte secondary battery

Figure 1:
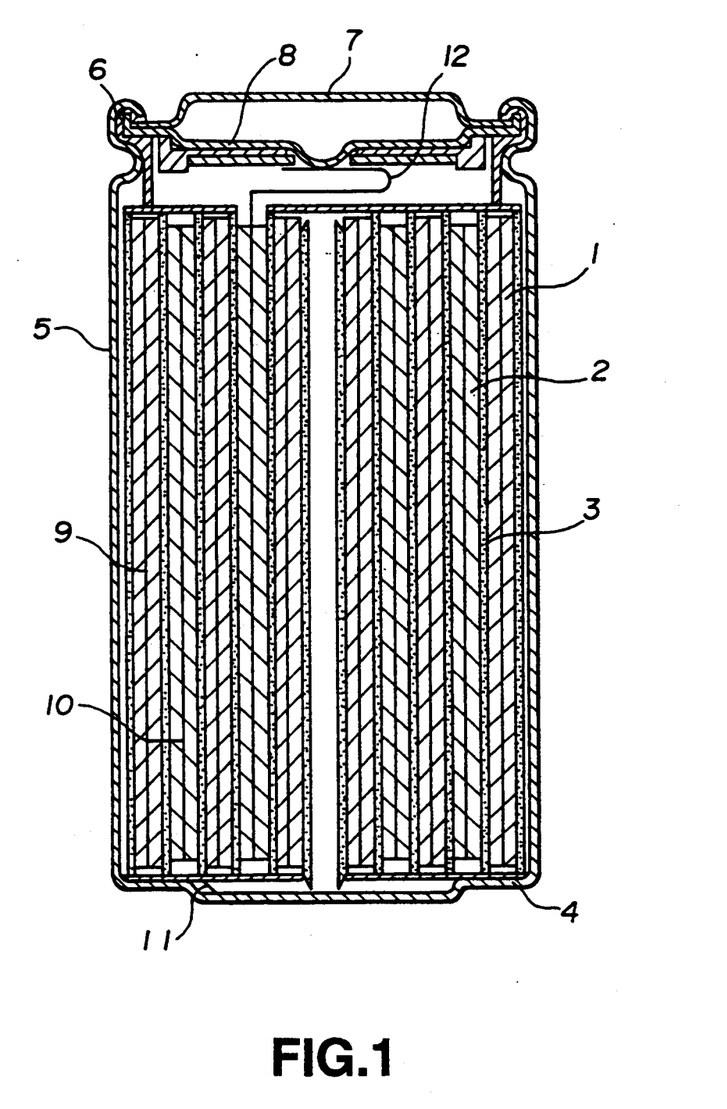
FIG. 1 is a cross-sectional view showing an example of structure of a non-aqueous liquid electrolyte secondary battery according to the present invention.

FIG. 1 shows the structure of the cylindrical non-aqueous liquid electrolyte secondary battery to be produced in the present embodiment. The cylindrical non-aqueous liquid electrolyte secondary battery of such a structure was formed in the following manner.

First, an anode 1 was produced as follows.

90 parts by weight of the concomitant body and 10 parts by weight of polyvinylidene fluoride (PVDF) as a binder were mixed to prepare a mixed anode agent. The mixed anode agent was diffused in N-methylpyrrolidone as a solvent to prepare a mixed anode agent slurry paste.

This mixed anode agent slurry was applied onto both surfaces of a band-shaped copper foil, 10 $\mu$m in thickness, as an anode collector 9, and was dried and compressed in molding to produce the band-shaped anode 1.

A cathode 2 was produced as follows.

0.5 mol of Lithium carbonate and 1 mol of cobalt carbonate were mixed together, and the resulting mixture was calcined in the air at 900°C. for 5 hours in the air, to form $LiCoO_2$. The peak of the $LiCoO_2$ thus produced, as measured by X-ray diffraction, was well in conformity with the peak of $LiCoO_2$ registered in the JCPDS file. This $LiCoO_2$ was ground into $LiCoO_2$ powders having the 50% cumulative grain diameter of 15 $\mu$m. 91 parts by weight of a mixture consisting of 95 parts by weight of the $LiCoO_2$ powders and 5 parts by weight of lithium carbonate powders, 6 parts by weight of graphite as a conductive material, and 3 parts by weight of polyvinylidene fluoride as a binder, were mixed together to prepare a mixed cathode agent. The cathode agent thus produced was diffused into N-methylpyrrolidone to prepare a mixed cathode agent slurry paste.

The mixed cathode agent slurry was uniformly applied onto both surfaces of a band-shaped aluminum foil, 20 $\mu$m in thickness, as a cathode collector 10, and was dried and compressed in molding to produce the band-shaped cathode 2.

Then, the band-shaped anode 1, the band-shaped cathode 2 and the separator 3 of a fine porous polypropylene film, 25 $\mu$m in thickness, were tacked in order of the anode 1, the separator 3, the cathode 2 and the separator 3, and were then coiled for a number of times to form a spiral electrode, 18 mm in outer diameter, as shown in FIG. 1.

The spiral electrode thus produced was contained in the nickel-plated iron battery can 5, and insulator plates 4 were placed on upper and lower surfaces of the spiral electrode. An aluminum cathode lead 12 was led out from the cathode collector 10 and welded to battery lid 7. A nickel anode lead 11 was led out from the anode collector 9 and welded to the battery can 5.

A liquid electrolyte, formed by dissolving $LiPF_6$ at a concentration of 1 mol/l into a mixed solvent of ethylene carbonate and diethyl carbonate mixed at a volume ratio of 1:1, was injected into the battery can 5 containing the spiral electrode therein. Then, a safety valve unit 8 having a anti-overcharging safety device and the battery lead 7 were caulked to be fixed to the battery can 5 through an insulating sealing gasket 6 coated with asphalt. Thus, a cylindrical non-aqueous liquid electrolyte secondary battery, 18 mm in diameter and 65 mm in height, was produced.

Then, the coin-shape non-aqueous liquid electrolyte secondary battery was intermittently charged and discharged for investigating the anode capacity, the capacity loss and the polarization value per gram of the anode material.

The battery was charged, that is, the anode was doped with lithium by repeating a charge/recess cycle of charging the battery at a constant current of 0.5 mA per cell for one hour and then having a two-hour recess, until the equilibrium potential presumed by plotting the change in voltage measured in the recess along the $time^{-\frac{1}{2}}$ reached 3 to 15 mV ($Li/Li^+$).

The battery was discharged, that is, the anode released lithium by repeating the discharge/recess cycle of discharging the battery at a constant current of 0.5 mA per cell for one hour and then having a two-hour recess until the terminal voltage reached 1.5 V.

The capacity loss was found by subtracting the discharge capacity from the charge capacity. It is known that the discharge capacity is smaller than the charge capacity with any anode material. The charged capacity which was not subject to discharge is herein called the capacity loss, as a matter of convenience.

The polarization value was found from a difference between the potential at the end of current-carrying and the equilibrium potential in the charge with a capacity of approximately 250 mAh per gram of the anode carbon powder.

The anode capacity and the capacity loss per gram of the graphite powder A and the non-graphitic carbon material 1, measured with the battery using solely the graphite powder A for the anode and the battery using solely the non-graphitic carbon powder 1, are shown in the following Table 1 along with the property parameters.

TABLE 1

| | interplanar distance of (002) plane (nm) | C-axis crystallite size of (002) plane (nm) | true density (g/cm³) | ave. grain diameter (μm) | anode capacity (mAh/g) | capacity loss (mAh/g) |
|---|---|---|---|---|---|---|
| graphite powder A | 0.336 | 38.1 | 2.29 | 25.4 | 320 | 77 |
| non-graphitic carbon powder 1 | 0.381 | 1.0 | 1.54 | 21.8 | 350 | 150 |

Figure 2:
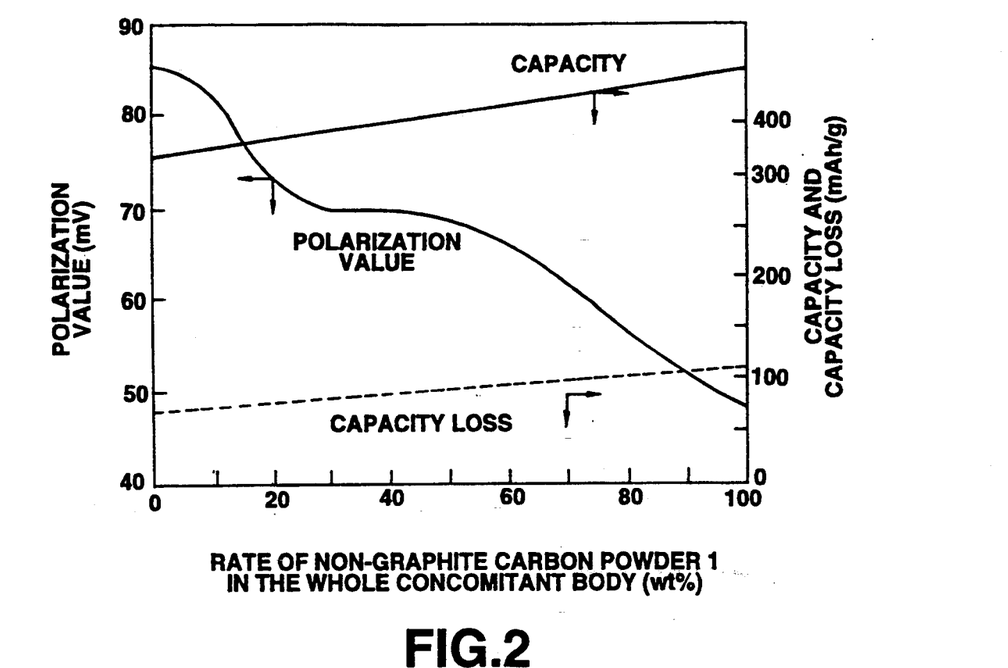
FIG. 2 is a graph showing relations of the rate of a non-graphitic carbon material in a concomitant body, the capacity per gram of an anode material, the capacity loss, and the polarization value after the charge.

Relations of the content rate of the non-graphitic carbon powder 1 in the whole concomitant body, the anode capacity, the capacity loss and the polarization value are shown in FIG. 2.

Meanwhile, the discharge capacity of the cylindrical non-aqueous liquid electrolyte secondary battery was measured by repeating a charge/discharge cycle of charging the battery at a maximum charge voltage of 4.2 V, a charge current of 1 A for 2.5 hours, and then discharging the battery at a constant resistance of 6.2Ω. Then, the number of cycles such that the discharge capacity is lowered to 50% of the initial level, hereinafter referred to as the number of cycles for 50% capacity, and the initial capacity ratio of the battery were investigated. Relations of the content rate of the non-graphitic carbon powder 1 in the whole concomitant body, the number of cycles for 50% capacity and the initial capacity ratio of the battery are shown in FIG. 3.

As apparent from FIG. 2, the anode capacity and the capacity loss gradually increase as the rate of the non-graphitic carbon powder 1 in the whole concomitant body increases. On the contrary, the polarization value after the charge significantly decreases as the rate of the non-graphitic carbon powder i in the whole concomitant body increases.

Figure 3:
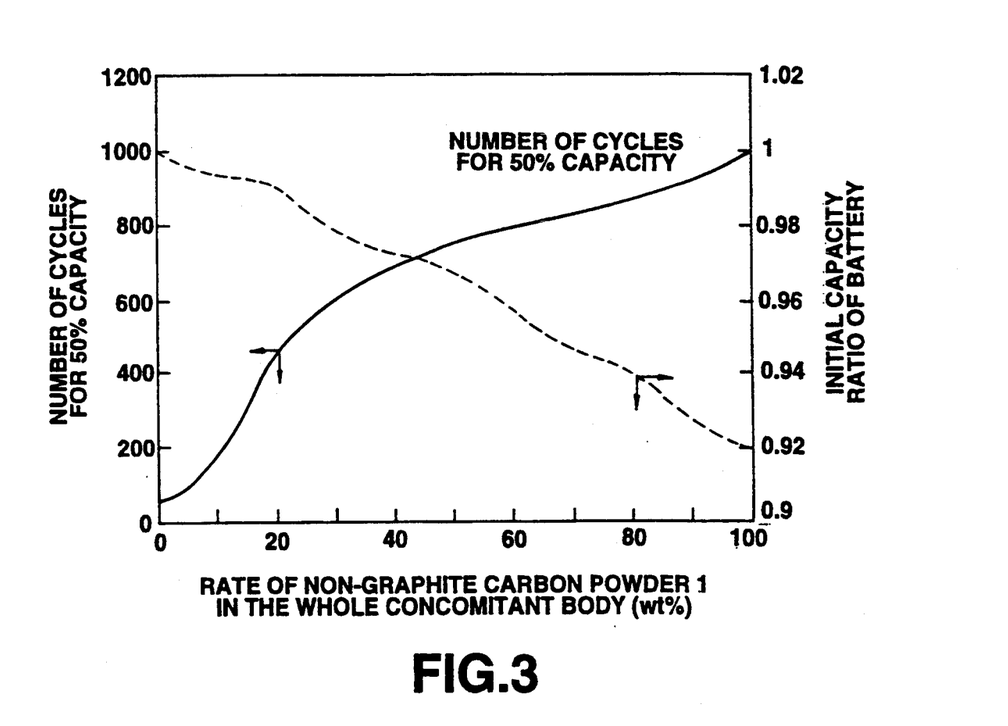
FIG. 3 is a graph showing relations of the rate of the non-graphitic carbon material in the concomitant body, the number of cycles for 50% capacity, and the initial capacity ratio of battery.

As seen in FIG. 3, the number of cycles for 50% capacity of the battery increases as the rate of the non-graphitic carbon powder 1 in the whole concomitant body increases, and therefore the cycle is unlikely to deteriorate. This is because the anode containing a large amount of non-graphitic carbon material is polarized only slightly and therefore does not cause the lithium metal to precipitate on its surface, while the anode containing a large amount of graphite, particularly the anode consisting solely of graphite, is greatly polarized in the charge, causing the lithium metal to precipitate on its surface.

However, as shown in FIG. 3, the initial capacity ratio of the battery decreases as the content rate of the non-graphitizable carbon powder in the active material increases. With the anode containing a large amount of the non-graphitizable carbon, particularly the anode consisting solely of the non-graphitizable carbon, it is not possible to obtain a high energy density.

From the above description, it is appreciated that the anode needs to be formed of the concomitant body of graphite and the non-graphitic carbon material instead of single graphite or single non-graphitic carbon material, to produce the non-aqueous liquid electrolyte secondary battery which is satisfactory in both cyclic property and energy density.

In this case, there is a tendency that the battery capacity increases as the mixing rate of the graphite material increases, and that the charge/discharge cyclic property is improved as the mixing rate of the non-graphitic carbon material increases. Thus, it is desirable to select the mixing rate of the graphite material and the non-graphitic carbon material based upon the importance of each property according to the use, in consideration of the above tendency. Practically, the rate of the non-graphitic carbon material in the whole concomitant body is preferably not less than 10% and not more than 90%, more preferably not less than 20% and not more than 80%.

Experiment 2

In the present experiment, the charge/discharge cyclic properties and capacities of batteries using various types of graphite and non-graphitic carbon materials for the anode were compared with one another. The types of graphite and non-graphitic carbon materials used in the present experiment are shown as follows.

Graphite:
  natural graphite powder produced in Madagascar (graphite A)
  artificial graphite powder produced by Lonza (graphite B)

Non-graphitic carbon material:
  non-graphitic carbon powders 2 to 7, which are produced in the following manner (1) Non-graphitic carbon powders 2, 3

Coal pitch as a raw material was held at 500° C. for 5 hours in a nitrogen stream, then heated up to 1200° to 1400° C., and heat-treated for one hour, to form the non-graphitic carbon powders 2 and 3.

(2) Non-graphitic carbon powder 4

Petroleum pitch as a raw material was held at 500° C. for 5 hours, then heated up to 1200° C., and heat-treated for one hour, to form the non-graphitic carbon powder 4.

(3) Non-graphitic carbon powders 5, 6

Petroleum pitch having an H/C atomic ratio of 0.6 to 0.8 was ground and oxidized in an air current, to form a carbon precursor. The oxygen content rate of this carbon precursor measured by elementary analysis was 15 to 18% by weight.

This carbon precursor was ground and held at 500° C. for 5 hours in a nitrogen stream. Then, the carbon precursor was heated up to 1100° to 1200° C. and heat-treated for one hour, to form the non-graphitic carbon powders 5 and 6.

(4) Non-graphitic carbon powder 7

A furfuryl alcohol resin as a raw material was held at 500° C. for 5 hours in a nitrogen stream, then heated up to 1200° C. and heat-treated for one hour, to form the non-graphitic carbon powder 7.

The interplanar distance of the (002) plane, the C-axis crystallite size of the (002) plane and the true density of the graphite powders A, B and the non-graphitic carbon powders 2 to 7 as described above are shown in Table 2.

Coin-shape non-aqueous liquid electrolyte secondary batteries of the structure similar to that of Experiment 1 were produced, using the graphite powders A, B and the non-graphitic carbon powders 2 to 7 as anode materials. The anode capacity per gram of material and the polarization value were measured by the interrupted charge/discharge. Also, to evaluate flatness of the discharge curve, the ratio of the discharge capacity up to a potential of 0.3 V to the discharge capacity up to a potential of 1.5 V was measured, vs. Li/Li+. Results of these measurements of the anode properties are shown in the following Table 2 along with the property parameters.

TABLE 2

| | category | interplanar distance of (002) plane (nm) | C-axis crystallite size of (002) plane (nm) | true density (g/cm³) | capacity (mAh/g) | 0.3V/1.5V capacity ratio |
|---|---|---|---|---|---|---|
| graphite powder A | natural graphite | 0.336 | 38.1 | 2.29 | 320 | 0.85 |
| graphite powder B | artificial graphite | 0.336 | 25.4 | 2.23 | 340 | 0.97 |
| non-graphitic carbon powder 2 | graphitizable carbon | 0.355 | 2.53 | 1.97 | 221 | 0.48 |
| non-graphitic carbon powder 3 | graphitizable carbon | 0.354 | 2.90 | 2.04 | 260 | 0.49 |
| non-graphitic carbon powder 4 | graphitizable carbon | 0.352 | 1.94 | 1.99 | 268 | 0.56 |
| non-graphitic carbon powder 5 | non-graphitizable carbon | 0.381 | 1.18 | 1.54 | 290 | 0.62 |
| non-graphitic carbon powder 6 | non-graphitizable carbon | 0.381 | 1.16 | 1.54 | 320 | 0.64 |
| non-graphitic carbon powder 7 | non-graphitizable carbon | 0.381 | 1.00 | 1.50 | 350 | 0.73 |

Then, the graphite powders A, B on one hand and the non-graphitic carbon powders 2 to 7 on the other were combined into a mixture at a variety of mixing rates, to form concomitant bodies. Coin-shape and cylindrical non-aqueous liquid electrolyte secondary batteries of the structure similar to that of Experiment 1, that is, batteries 2-1 to 2-10 and comparative batteries 2-1 to 2-3, were produced, using the concomitant bodies of graphite and non-graphitic carbon material for the anode.

The types of concomitant bodies used as the anode materials of the batteries and the mixing rates are shown in Table 3.

The polarization value of the anode materials was measured by intermittently charging and discharging the coin-shape batteries.

The measured polarization value and the initial battery capacity are shown in the following Table 3 along with the types of concomitant bodies and the mixing rates.

TABLE 3

| | graphite | non-graphitic carbon material | graphite (parts by wt): non-graphitic carbon material (parts by wt) | battery capacity (Wh) | polarization value (mV) |
|---|---|---|---|---|---|
| battery | | | | | |
| 2-1 | graphite powder A | non-graphitic carbon powder 6 | 20:80 | 4.84 | 72 |
| 2-2 | graphite powder A | non-graphitic carbon powder 6 | 50:50 | 4.58 | 65 |
| 2-3 | graphite powder A | non-graphitic carbon powder 6 | 70:30 | 4.42 | 60 |
| 2-4 | graphite powder A | non-graphitic carbon powder 6 | 90:10 | 4.24 | 50 |
| 2-5 | graphite powder A | non-graphitic carbon powder 2 | 50:50 | 4.33 | 61 |
| 2-6 | graphite powder A | non-graphitic carbon powder 3 | 50:50 | 4.58 | 63 |
| 2-7 | graphite powder A | non-graphitic carbon powder 4 | 50:50 | 4.63 | 66 |
| 2-8 | graphite powder A | non-graphitic carbon powder 5 | 50:50 | 4.43 | 64 |
| 2-9 | graphite powder A | non-graphitic carbon powder 7 | 50:50 | 4.35 | 62 |
| 2-10 | graphite powder B | non-graphitic carbon powder 6 | 50:50 | 4.56 | 55 |
| comparative battery | | | | | |
| 201 | graphite powder A | — | 100:0 | 5.01 | 85 |
| 2-2 | — | non-graphitic carbon powder 6 | 0:100 | 4.14 | 45 |
| 2-3 | graphite powder B | — | 100:0 | 5.02 | 76 |

The battery capacity per cycle of the cylindrical battery was measured by repeating a charge/discharge cycle of charging the battery at a constant voltage and a constant current with an upper limit voltage of 4.2 V and with a current of 1 A in a constant current area, and then discharging the battery at a constant current of 0.5 A, a final voltage of 2.75 V.

Figure 4:
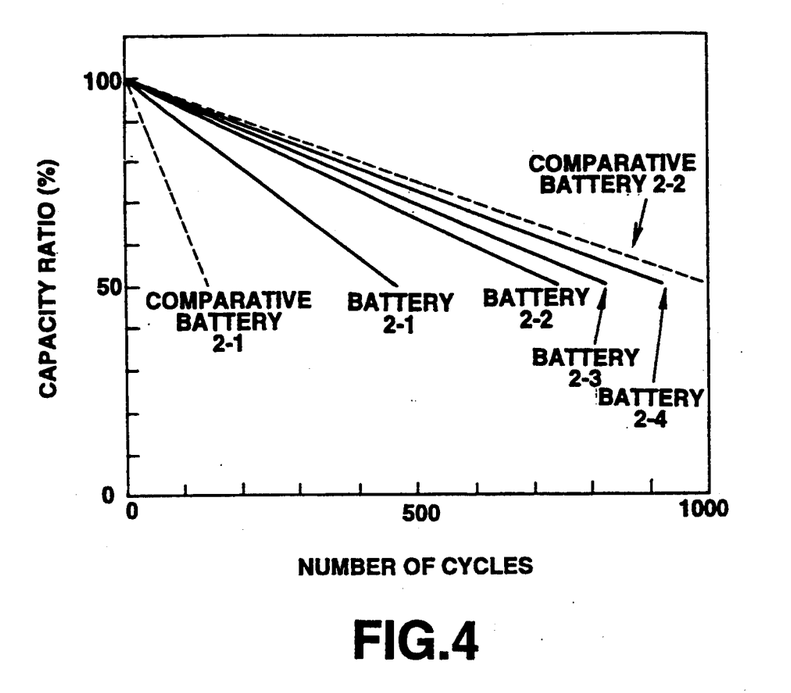
FIG. 4 is a graph showing relations between the number of charge/discharge cycles and the capacity ratio of batteries having different rates of the non-graphitic carbon material in the concomitant body.
Figure 5:
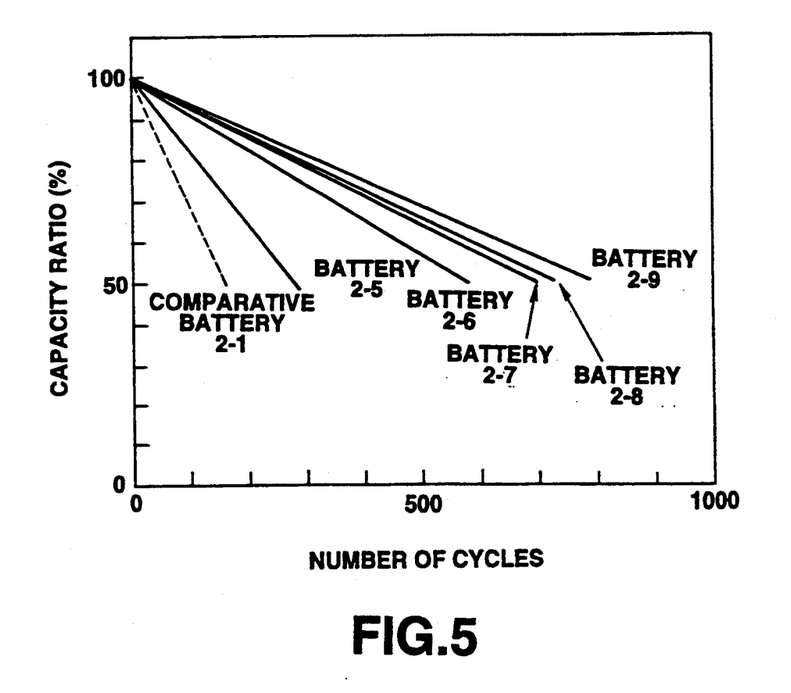
FIG. 5 is a graph showing relations between the number of charge/discharge cycles and the capacity ratio of batteries having different kinds of non-graphitic carbon materials.
Figure 6:
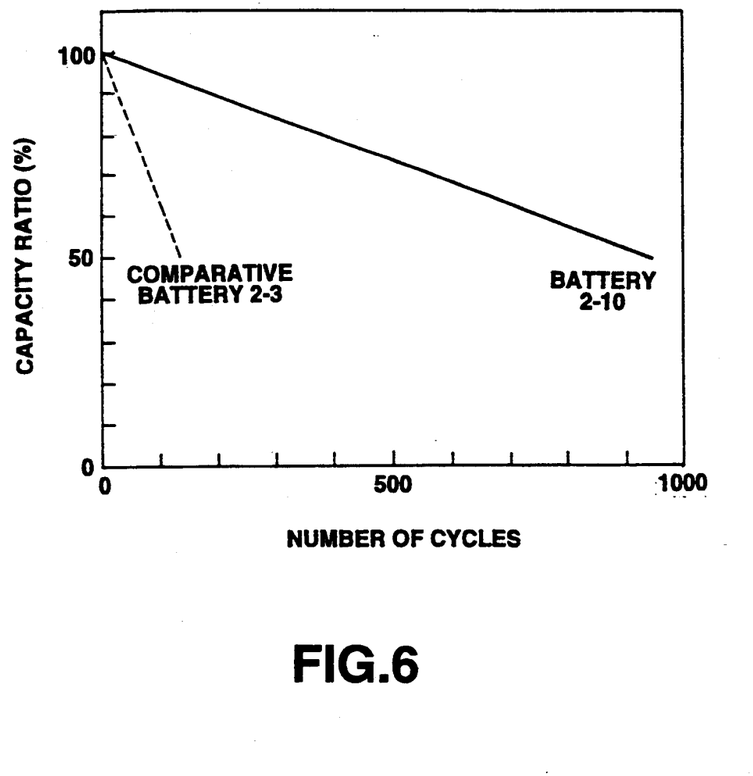
FIG. 6 is a graph showing relations between the number of charge/discharge cycles and the capacity ratio of a battery using artificial graphite.

Relations between the number of charge/discharge cycles and the battery capacity are shown in FIGS. 4 through 6. FIG. 4 also shows charge/discharge cyclic properties of batteries in which the same types of graphite and non-graphitic carbon material, that is, the graphite powder A and the non-graphitic carbon powder 6, are mixed at different mixing ratios. FIG. 5 also shows charge/discharge cyclic properties of batteries in which graphite and different types of non-graphitic carbon materials are mixed at the same mixing ratio, that is, 50:50 parts by weight. FIG. 6 also shows charge/discharge cyclic properties of batteries in which artificial graphite, that is, the graphite powder B, is used. In FIGS. 4 through 6, capacity ratios on the axis of ordinate are represented by relative values with the initial capacity being indicated by 100%.

As shown in FIG. 4, the batteries 2-1 to 2-4 using the concomitant body of the graphite powder A and the non-graphitic carbon powder 6 for the anode have less capacity deterioration in proceeding of the charge/discharge cyclic properties than the comparative battery 2-1 using only the graphite powder A for the anode. Also, the batteries 2-1 to 2-4 have greater initial battery capacities than the comparative battery 2-2 using only the non-graphitic carbon powder 6 for the anode as shown in Table 3. With the battery using the concomitant body of the graphite powder A and the non-graphitic carbon powder 6 for the anode, as the mixing rate of the non-graphitic carbon powder 6 in the concomitant body increases, charge/discharge cyclic properties are improved while the battery capacity decreases.

All these results are in conformity with the those of Embodiment 1. Thus, it is appreciated that using the concomitant body of the graphite and the non-graphitic carbon material mixed at a suitable rate is effective for producing the battery having a large capacity and satisfactory charge/discharge cyclic properties.

Then, as shown in FIG. 5, since the batteries 2-5 to 2-9 use the concomitant bodies of the graphite and different types of non-graphitic carbon materials mixed at the same mixing ratio for the anode, the charge/discharge cyclic properties differ greatly.

The battery 2-5 using the non-graphitic carbon powder having an anode capacity smaller than 80% of the anode capacity of the graphite A, that is, 256 mA/g, measured by intermittent charging and discharging technique and shown in Table 2, has less improvement in cyclic property than the comparative battery 2-1 using only the graphite A for the anode.

On the contrary, the batteries 2-6 to 2-9 using the non-graphitic carbon powders 3 to 7 having the anode capacity not smaller than 80% of that of the graphite A measured by the intermittent charging and discharging technique have greater improvement in cyclic properties than the comparative battery 21. In addition, the batteries 2-7 to 2-9 using the non-graphitic carbon materials having satisfactory flatness of the discharge curve, that is, the non-graphitic carbon powders 4 to 7 shown in Table 2 in which the ratio of the discharge capacity up to 0.3 V to the discharge capacity up to 1.5 V is not smaller than 0.5, exhibit very high cyclic properties. Also, the batteries 2-8 and 2-9, using the non-graphitic carbon powders 5 to 7 in which the ratio of the discharge capacity up to 0.3 V to the discharge capacity up to 15 V is not smaller than 0.5 and in which the anode capacity measured by the intermittent charging and discharging technique is not smaller than 90% of that of the graphite A measured similarly, exhibit satisfactory cyclic properties.

As seen from the above results, to produce the battery having satisfactory cyclic properties, it is desirable to consider the anode capacity and the flatness of the discharge curve of the non-graphitic carbon material to be used, instead of simply combining the graphite and the non-graphitic carbon material.

Then, as shown in FIG. 6, the battery 2-10, using the concomitant body of the graphite powder B that is the artificial graphite, and the non-graphitic carbon powder 6 mixed at a ratio of 50:50 parts by weight, exhibits satisfactory cyclic property at the same level as that of the battery 2-2 using the concomitant body of the graphite A, that is the natural graphite, and the non-graphitic carbon powder 6 mixed at the same ratio.

From the above results, it is found that either the natural graphite or the artificial graphite can be used for the graphite of the present battery, and that the charge/discharge cyclic property depends upon the electrochemical property of the graphite, not upon the production method of the graphite.

Experiment 3

In the present experiment, the numbers of cycles for 50% capacity of two different cases were compared with each other. In one case, a concomitant body which was formed by mixing separately produced graphite powder and non-graphitic carbon powder was used for the anode. In the other case, a concomitant body which was produced by forming a composite carbon material of graphite and the non-graphitic carbon material and grinding the composite carbon material was used for the anode. In addition, the rise in temperature in the overcharge were compared with each other using various types of non-aqueous liquid electrolytes.

Production methods of the concomitant bodies used in the present experiment will now be described.

(1) Concomitant body 1

The graphite material powder 1 and the non-graphitic carbon material powder were mixed at a mixing ratio of 6:4, to form the concomitant body 1.

(2) Concomitant body 2

100 parts by weight of furfuryl alcohol, 0.5 parts by weight of phosphoric acid of a concentration of 85%, and 10 parts by weight of water were mixed into a liquid mixture and heated in a hot water bath for 5 hours, to synthesize a polymer having consistency, that is, a furfuryl alcohol resin in this case. Residual water and alcohol which had not reacted were removed through vacuum distillation.

18 parts by weight of the graphite powder formed by grinding the natural graphite produced in Madagascar were added to 100 parts by weight of the synthesized furfuryl alcohol resin, and 100 g of the whole mixture was taken out and mixed sufficiently in a hot water bath. The resulting mixture was carbonized at 500° C. in a nitrogen stream for 5 hours, then heated up to 1100° C., and heat-treated for one hour, to form approximately 35 g of composite carbon material. The composite carbon material was ground to form the concomitant body 2.

The component ratio of this composite carbon powder was found by separating the diffraction peak of the (002) plane measured by powder X-ray diffraction. The ratio of the graphite to the non-graphitizable carbon was thus found to be 6:4.

(3) Concomitant body 3

4 parts by weight of phosphoric acid of a concentration of 85% was added to a furfuryl alcohol resin synthesized as in the preparation of the concomitant body 2. The resulting mixture was carbonized at 500° C. for 5 hours in a nitrogen stream, then heated up to 1100° C. and heat-treated for one hour, to form a non-graphitizable carbon consisting mainly of phosphorus, oxygen and carbon.

The graphite powder formed by grinding the natural graphite produced in Madagascar and the non-graphitizable carbon formed in the above manner were sufficiently mixed at a mixing ratio of 6:4, to prepare the concomitant body 3.

(4) Concomitant body 4

Metallic iron particles of an average grain diameter of approximately 5 μm were added by 10% by weight to a furfuryl alcohol resin synthesized as in the preparation of the concomitant body 2, and the resulting mixture was heated at approximately 100° C. When the resin was liquified, it was agitated well and ion particles were diffused therein. The resulting mixture was carbonized at 500° C. for 5 hours in a nitrogen stream, then heated up to 1200° C., and heat-treated for one hour, to form the concomitant body of the non-graphitic carbon material with the non-graphitizable carbon material partly changed into graphite phase and the graphite material.

The component ratio of this concomitant body was found by separating the diffraction peak of the (002) plane measured by powder X-ray diffraction. The ratio of the graphite and the non-graphitizable carbon material was thus found to be approximately 5:5.

Also, non-aqueous liquid electrolytes used in the present experiment will now be explained.

(5) Non-aqueous liquid electrolyte 1

EC and DEC were mixed at a volume ratio of EC:-DEC=1:1, and $LiPF_6$ was dissolved at a concentration of 1 mol/l into this mixed solvent, to prepare the non-aqueous liquid electrolyte 1.

(6) Non-aqueous liquid electrolyte 2

EC and MEC were mixed at a volume ratio of EC:-MEC=1:1, and $LiPF_6$ was dissolved at a concentration of 1 mol/l into this mixed solvent, to prepare the non-aqueous liquid electrolyte 2.

(7) Non-aqueous liquid electrolyte 3

EC, MEC and DMC were mixed at a volume ratio of EC:MEC:DMC=5:3:2, and $LiPF_6$ was dissolved at a concentration of 1 mol/l into this mixed solvent, to prepare the non-aqueous liquid electrolyte 3.

With these concomitant bodies and the non-aqueous liquid electrolytes, cylindrical non-aqueous liquid electrolyte secondary batteries 3-1 to 3-6 were produced in a manner similar to Experiment 1. The concomitant bodies and the non-aqueous liquid electrolytes used in the batteries are shown in the following Table 4.

TABLE 4

|  | concomitant body | non-aqueous liquid electrolyte |
|---|---|---|
| battery 3-1 | concomitant body 1 | non-aqueous liquid electrolyte 1 |
| battery 3-2 | concomitant body 2 | non-aqueous liquid electrolyte 1 |
| battery 3-3 | concomitant body 3 | non-aqueous liquid electrolyte 1 |
| battery 3-4 | concomitant body 4 | non-aqueous liquid electrolyte 1 |
| battery 3-5 | concomitant body 1 | non-aqueous liquid electrolyte 2 |
| battery 3-6 | concomitant body 1 | non-aqueous liquid electrolyte 3 |

The discharge capacities of the batteries were measured by repeating a charge/discharge cycle of charging the batteries at a maximum charge voltage of 4.2 V, a charge current of 1 A, for 2.5 hours, and then discharging the batteries at a constant resistance of 6.2Ω. Then, the number of cycles such that the discharge capacity is lowered to 50% of the initial capacity, that is, the number of cycles for 50% capacity, was investigated.

Also, the batteries were charged at a constant current of 3.7 A to be overcharged, and changes in temperature of the battery surfaces after the anti-overcharging safety device operated on the overcharge were investigated. The numbers of cycles for 50% capacity and the maximum temperatures in the overcharge are shown in the following Table 5.

TABLE 5

|  | maximum temperature in overcharge (°C.) | number of cycles for 50% capacity |
|---|---|---|
| battery 3-1 | 82 | 524 |
| battery 3-2 | 81 | 541 |
| battery 3-3 | 80 | 550 |
| battery 3-4 | 80 | 538 |
| battery 3-5 | 69 | 590 |
| battery 3-6 | 66 | 607 |

As shown in Table 5, the batteries 3-1 to 3-6 using carbon powders containing graphite powders and non-graphitizable carbon powders for the anode exhibit satisfactory cyclic properties, with the number of cycles for 50% capacity greater than in the case of using only graphite for the anode in Experiment 1, in which the number of cycles for 50% capacity is about 60 as shown in FIG. 3.

Thus, any concomitant body of the graphite and the non-graphitic carbon material, that is, either the mixed carbon powder formed by mixing the graphite powder and the non-graphitizable carbon powder or the composite carbon powder formed by grinding composite carbon of the graphite and the non-graphitizable carbon, can be used in the non-aqueous liquid electrolyte secondary battery. In either case, the cyclic property and the battery capacity can be improved.

In addition, the maximum temperature in the overcharge is lower in the batteries 3-5 and 3-8 than in the battery 3-1. Thus, the batteries 3-5 and 3-8 exhibit higher safety.

As found from these results, MEC and an MEC-DMC mixed solvent are preferred to DEC as the second solvent to be added to EC which is the main solvent of the non-aqueous solvent.

What is claimed is:

1. A non-aqueous liquid electrolyte secondary battery comprising:
   an anode formed of a carbon material as an anode material capable of doping and de-doping lithium ions;
   a cathode formed of an lithium-containing transition metal composite oxide as an active cathode material; and
   a non-aqueous liquid electrolyte;
   the carbon material as the anode material containing graphite and a non-graphitic carbon material formed of at least one carbon material selected from the group consisting of a non-graphitizable carbon material and a graphitizable carbon material, wherein the non-graphitic carbon material exhibits a discharge capacity per gram which is equal to and greater than 80% of the discharge capacity per gram of the graphite material, both discharge capacities being measured in a first cycle of intermittent charging and discharging, and occupies 10 to 90% by weight of a total amount of the non-graphitic carbon material and the graphite.

2. The non-aqueous liquid electrolyte secondary battery as claimed in claim 1, wherein the non-graphitic carbon material exhibits a ratio of a discharge capacity up to 0.3 V to a discharge capacity up to 1.5 V which is equal to and greater than 0.5, measured in the first cycle of intermittent charging and discharging based on lithium potential.

3. The non-aqueous liquid electrolyte secondary battery as claimed in claim 1, wherein the graphite has a true density of 2.1 g/cm$^3$ or greater, an interplanar distance of (002) plane of less than 0.340 nm found by X-ray diffraction, and a C-axis crystallite size of the (002) plane of 14.0 nm and greater.

4. The non-aqueous liquid electrolyte secondary battery as claimed in claim 1, wherein the non-graphitic carbon material is a hard carbon material which has a true density of 1.70 g/cm$^3$ or smaller, an interplanar distance of (002) plane of 0.37 nm and greater found by x-ray diffraction, and no exothermic peak observed at temperatures not lower than 700° C. in differential thermal analysis in an air stream.

5. The non-aqueous liquid electrolyte secondary battery as claimed in claim 4, wherein the non-graphitizable carbon material contains phosphorus.

6. The non-aqueous liquid electrolyte secondary battery as claimed in claim 1, wherein the carbon material containing the non-graphitic carbon material and the graphite is formed by adding a material selected from a metal composed of elements of IVb to VIIb and VIII groups in a periodic table and a compound thereof as a graphitization catalyst to a material selected from the group consisting of the carbon material formed of at least one of the non-graphitizable carbon material; and the graphitizable carbon material, a raw material of the non-graphitizable carbon material, a raw material of the graphitizable carbon material; and then heating the added materials.

7. The non-aqueous liquid electrolyte secondary battery as claimed in claim 1, wherein the non-aqueous liquid electrolyte is a liquid electrolyte formed by dissolving an electrolyte into a non-aqueous solvent containing ethylene carbonate.

8. The non-aqueous liquid electrolyte secondary battery as claimed in claim 7, wherein the non-aqueous solvent contains chain carbonic ester.

9. The non-aqueous liquid electrolyte secondary battery as claimed in claim 8, wherein the chain carbonic ester is asymmetrical chain carbonic ester.

10. The non-aqueous liquid electrolyte secondary battery as claimed in claim 8, wherein the chain carbonic ester is a mixed solvent of methylethyl carbonate and dimethyl carbonate.

* * * * *